United States Patent [19]

Cooper

[11] Patent Number: 5,237,782
[45] Date of Patent: Aug. 24, 1993

[54] SLIDABLE ROOM ASSEMBLY FOR RECREATIONAL VEHICLES

[75] Inventor: Denzil R. Cooper, Nuevo, Calif.

[73] Assignee: Fleetwood Enterprises, Inc., Riverside, Calif.

[21] Appl. No.: 694,122

[22] Filed: May 1, 1991

[51] Int. Cl.$^5$ .......................................... E04B 1/343
[52] U.S. Cl. ....................................... 52/67; 296/26; 296/171; 296/175
[58] Field of Search ................ 296/26, 165, 171, 175; 52/67; 174/D9

[56] References Cited

U.S. PATENT DOCUMENTS

| Re. 32,262 | 10/1986 | Stewart | 296/26 |
|---|---|---|---|
| 2,243,659 | 5/1941 | Thompson. | |
| 2,519,517 | 8/1950 | Van Tassel. | |
| 2,561,921 | 7/1951 | Guillot. | |
| 2,739,833 | 3/1956 | Schenkel et al. | |
| 2,744,781 | 5/1956 | Black | 296/171 |
| 2,820,666 | 1/1958 | Grochmal | 296/171 |
| 2,822,212 | 2/1958 | Frey | 296/23 |
| 2,906,556 | 9/1959 | Cantele et al. | 296/26 |
| 3,116,085 | 12/1963 | Uttley | 296/26 |
| 3,341,986 | 9/1967 | Brosig. | |
| 3,572,809 | 3/1971 | Buland | 296/175 |
| 3,792,189 | 2/1974 | Stengel et al. | 174/69 |
| 3,797,880 | 3/1974 | Pezzaglia | 206/26 |
| 4,049,310 | 9/1977 | Yoder | 296/26 |
| 4,133,571 | 1/1979 | Fillios | 296/26 |
| 4,253,283 | 3/1981 | May | 52/67 |
| 4,955,661 | 9/1990 | Mattice | 296/171 |

FOREIGN PATENT DOCUMENTS

| 1055976 | 6/1956 | Fed. Rep. of Germany | 296/165 |
|---|---|---|---|
| 2026360 | 5/1970 | Fed. Rep. of Germany | 296/179 |
| 2712270 | 9/1978 | Fed. Rep. of Germany | 296/171 |
| 2573016 | 11/1984 | France | 296/165 |
| 0083317 | 7/1983 | Italy | 296/26 |
| 2001589 | 7/1978 | United Kingdom | 296/26 |

*Primary Examiner*—Carl D. Friedman
*Assistant Examiner*—Christopher Kent
*Attorney, Agent, or Firm*—Price, Gess & Ubell

[57] ABSTRACT

A slidable room having an improved slide-out assembly and an improved liquid sealing assembly at an interface between an opening in the recreational vehicle and an exterior wall of the room is provided. The slide-out assembly includes a stationary main frame assembly having a pair of support members held in a fixed parallel relationship, a single transmission mechanism fixedly interposed between the support members, and a slidable support assembly slidably retained in the pair of support members for extending and contracting the room. The liquid sealing assembly is disposed around the interface between the slidable room and the opening in the recreational vehicle's exterior wall. A first flange member is affixed to a top edge and side edges of the slidable room's exterior wall. A second complementary flange member is affixed to a top edge and side edges of the opening in the recreational vehicle. The flange members include adjacent protrusions for inhibiting the flow of liquid therebetween when the slidable room is fully retracted into the recreational vehicle.

22 Claims, 4 Drawing Sheets

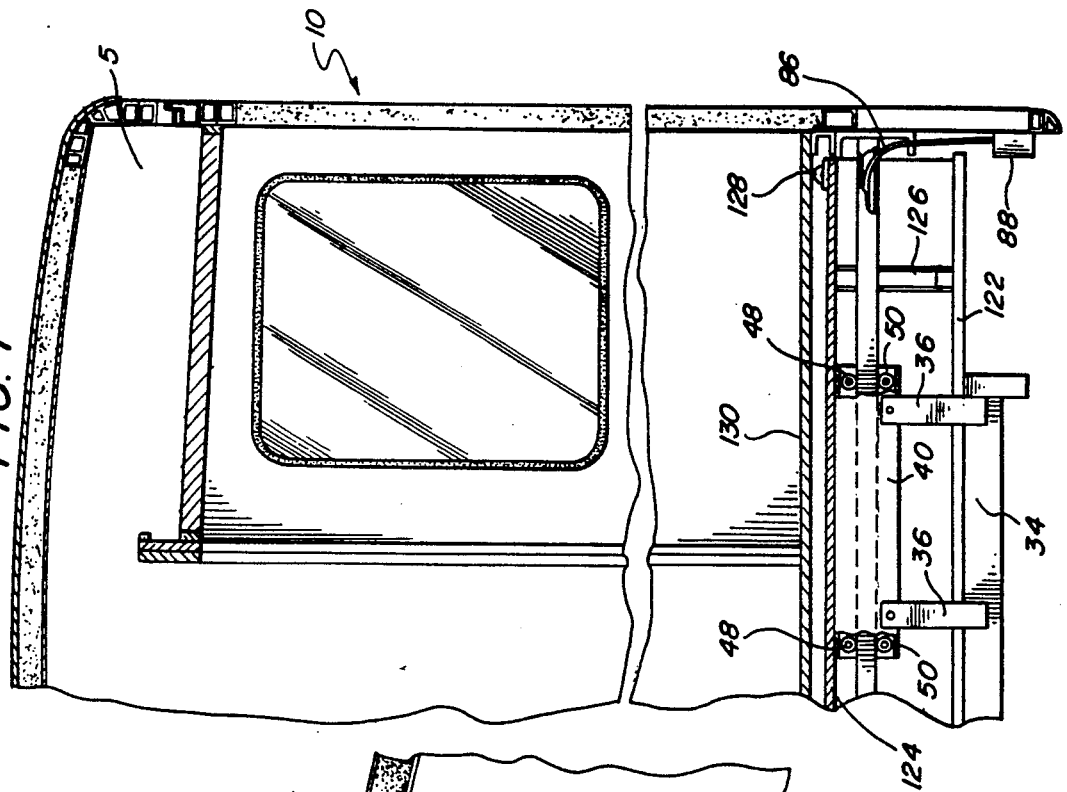
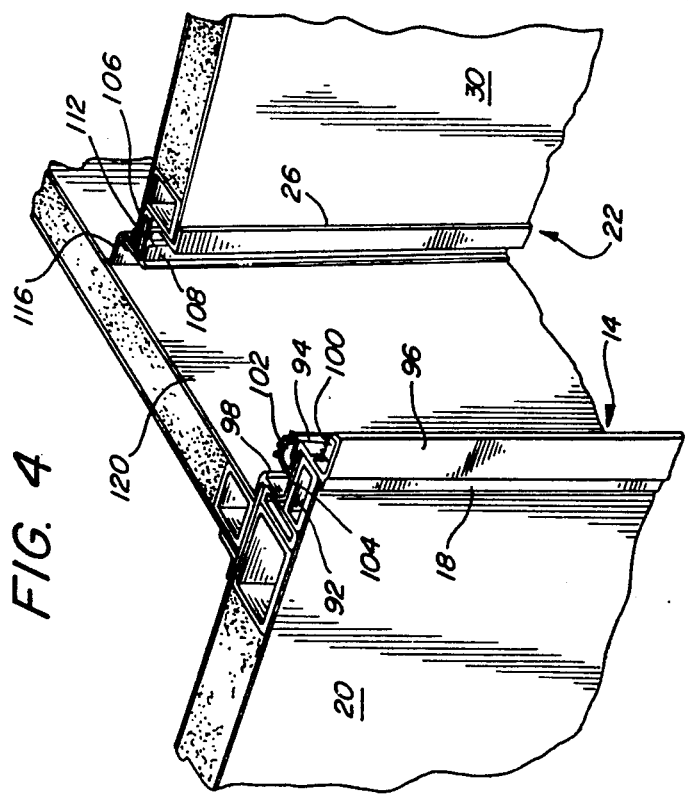

SLIDABLE ROOM ASSEMBLY FOR RECREATIONAL VEHICLES

BACKGROUND OF THE INVENTION

1. Field of the Invention

The subject invention relates generally to recreational vehicles and, more particularly, to an expandable or slidable room in a recreational vehicle that can be economically manufactured.

2. Description of Related Art

In order to increase the available interior space of recreational vehicles, such as trailers, including those commonly referred to as "fifth wheels," slide-out rooms can be made integral with the vehicle. During transit, these rooms can be retracted and stored in the vehicle's interior, with the exterior wall of the slide-out room approximately flush with the vehicle's exterior. To use the slide-out room, the vehicle is first parked and leveled. The slide-out room is then slid outward from the vehicle, increasing the interior space of the vehicle.

A problem with slide-out rooms is that during transit under adverse conditions such as rain, sleet, or snow, water tends to leak into the interior of the vehicle in the area between the slide-out room and the exterior wall of the vehicle. Water may even leak into the vehicle when the vehicle is being stored in inclement weather. The effectiveness of sealing systems currently being used can be improved to address this problem.

A number of motive devices are currently used to extend and retract slide-out rooms. These devices may be hydraulic, pneumatic, electric, simple gearing mechanisms, or various combinations thereof. An example of a prevalent electronically actuated gearing mechanism includes first and second cylindrical extending posts that are affixed to a power assembly. The power assembly is actuated electronically and is directly connected to the first cylindrical post using gears for extending and contracting an inner sleeve in the post. The second post is connected to the power assembly through a series of shafts and gear boxes. A gear box interposed between the posts has a hand crank adaptor so the posts can be extended or contracted by hand if the electrical power fails.

A disadvantage of this design exists in that the second post is connected to the power assembly through the series of gear boxes and shafts, and there may be synchronism problems between the first and second posts when they are extending or contracting. This can result in the room becoming skewed or binding during the transit sliding action. Another disadvantage of this design is that the post's inner sleeves are load-bearing, which can result in an excessive strain on the inner sleeves, posts, and power assembly when sliding the room. A further disadvantage of this design is that the inner sleeves of the posts are exposed to various environmental elements such as rain, dirt, and road grime when the room is extended, as well as during sliding of the room. These elements can slowly deteriorate the inner sleeves and the interior of the posts. An example of one type of slide-out mechanism is manufactured by Barker Manufacturing of Battle Creek, Mich.

Another slide-out mechanism design uses a pair of hydraulically-actuated cylindrical posts embodying some of the design features of the prior mechanism. This mechanism uses common hydraulic principles to extend and contract the room. A disadvantage of the hydraulically-actuated design is that the room is typically actuated from outside the vehicle, which can expose the user to adverse environmental elements. Other disadvantages of the hydraulic design include skewing and binding of the room while sliding the room, and load-bearing posts being exposed to environmental elements.

U.S. Pat. No. 2,822,212 discloses a mobile trailer that has a motor capable of driving three power screw members to expand and contract walls and floors of the mobile trailer.

U.S. Pat. No. 2,744,781 discloses an expansible vehicle body that has an expansion section on either side. An overlap of a floor member pivots downward when the vehicle body is in he expanded state. A hand crank is used to achieve expansion and retraction of the expansion sections.

Finally, housings having expansible sections and devices used to expand and contract expansible sections are disclosed in the following patents: U.S. Pat. Nos. 2,243,659; 2,519,517; 2,561,921; 2,739,833; 2,744,781; 2,822,212; and 3,341,986.

SUMMARY OF THE INVENTION

It is therefore an object of the present invention to provide an improved slidable room for recreational vehicles;

It is another object of the invention to provide an improved liquid sealing assembly that inhibits the flow of liquid between an exterior wall of the slidable room and an opening in the recreational vehicle;

It is another object of the present invention to provide a slide-out assembly having a transmission assembly that is substantially free of load-bearing forces that support the weight of the slidable room;

It is another object of the present invention to provide a slide-out assembly that includes a single transmission mechanism; and It is another object of the present invention to provide a slide-out assembly having a transmission mechanism which can be protected from external environmental elements.

These and other objects of the present invention are achieved by providing a slidable room for a recreational vehicle having a slide-out assembly that includes a stationary main frame assembly and a slidable support assembly that is affixed to the room.

The stationary main frame assembly is affixed to a chassis of the recreational vehicle and includes a pair of support members that are held in a fixed parallel relationship. A single transmission mechanism is interposed between the support members so that the transmission mechanism is not subject to load-bearing forces for supporting the weight of the room. The slidable support assembly is affixed to the room and is slidably retained in the pair of support members for extending and contracting the room in response to the operation of the transmission mechanism.

A preferred embodiment of the slidable room includes an improved sealing assembly between an interface of the slidable room and an opening in a side of the recreational vehicle for preventing water from leaking into the recreational vehicle when the room is fully contracted. A first flange member is affixed to a top edge and side edges of an exterior wall of the room. The flange member has an elongated portion extending axially away from the exterior wall of the room and includes a plurality of protrusions on its interior sides. A second complementary flange member is affixed to a top edge and side edges of the opening in the recreational vehicle. The second flange member includes a plurality of complementary protrusions on its exterior sides for inhibiting water from flowing between the first flange member and the second flange member when the room is fully contracted. The sealing assembly further includes flexible seals for further preventing liquid from flowing between the flange members.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 is a perspective view of a preferred embodiment of a sealing assembly of the present invention in an open position;

FIG. 7 is a side elevated partial cross-sectional view of the present invention in a storage position.

DESCRIPTION OF THE PREFERRED EMBODIMENTS

The following description is provided to enable any person skilled in the recreational vehicle manufacturing art to make and use the invention and sets forth the best modes contemplated by the inventor of carrying out his invention. Various modifications, however, will remain readily apparent to those skilled in these arts, since the generic principles of the present invention have been defined herein specifically to provide a relatively economical process for manufacturing a slidable room of an improved structure on a production basis.

Figure 1:
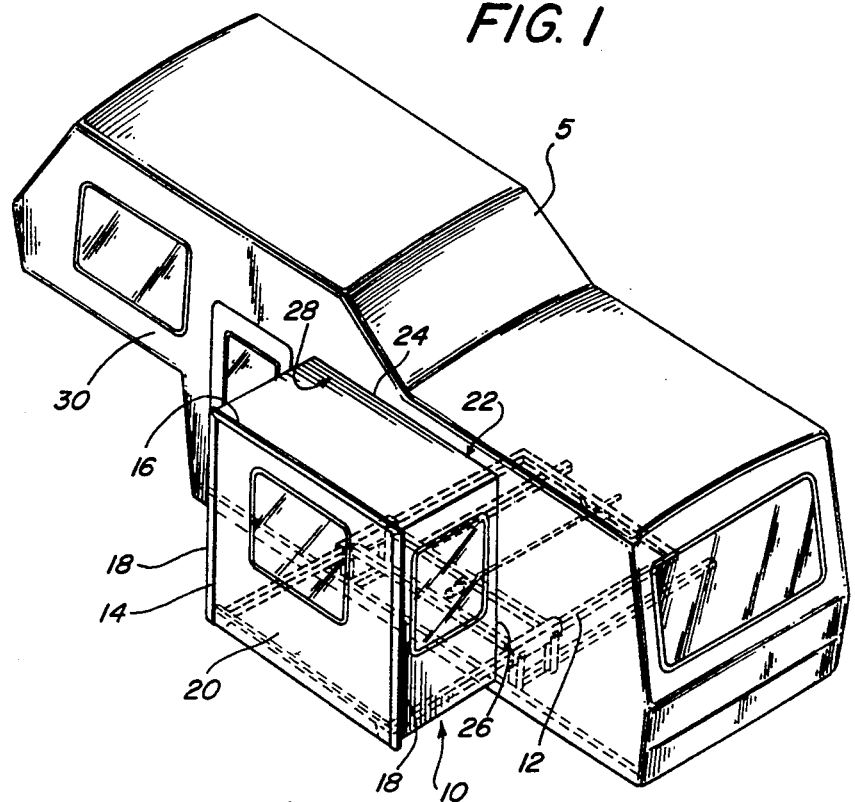
FIG. 1 is a perspective view of a recreational vehicle including a preferred embodiment of the present invention, partially shown in phantom.

Referring to FIG. 1, there is shown a recreational vehicle (RV) 5, including a preferred embodiment of a slidable room 10 constructed according to the principles of the present invention. The slidable room 10 includes a slide-out assembly 12 for extending and contracting the room. A first liquid sealing assembly 14 is made integral with a top edge 16 and side edges 18 of an external wall 20 of the room 10. The wall 20 is larger than an opening 28 in the exterior wall 30 of the RV. A second liquid sealing assembly 22 is made integral with a top edge 24 and side edges 26 of the opening 28 in the exterior wall 30 of the RV 5.

Figure 2:
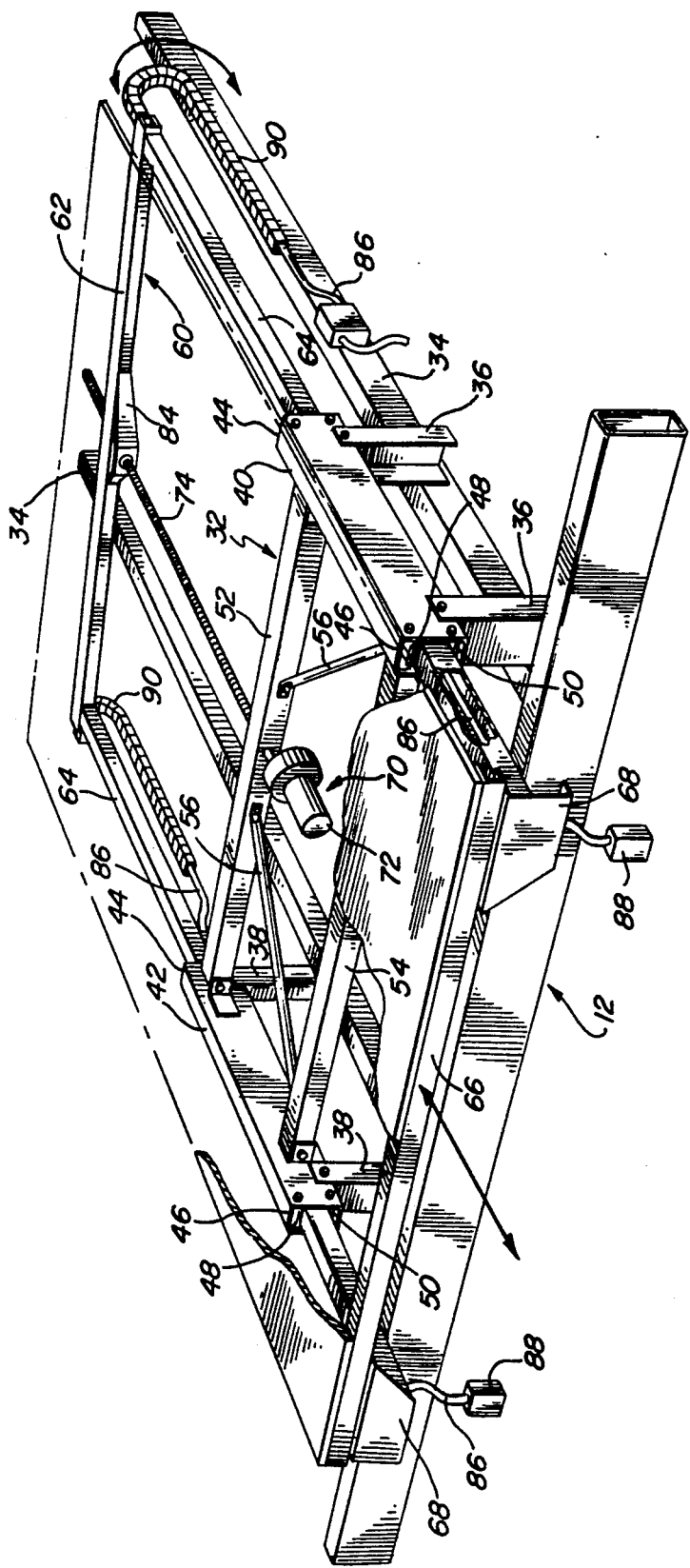
FIG. 2 is a perspective view of a preferred embodiment of the slide-out assembly.
Figure 3:
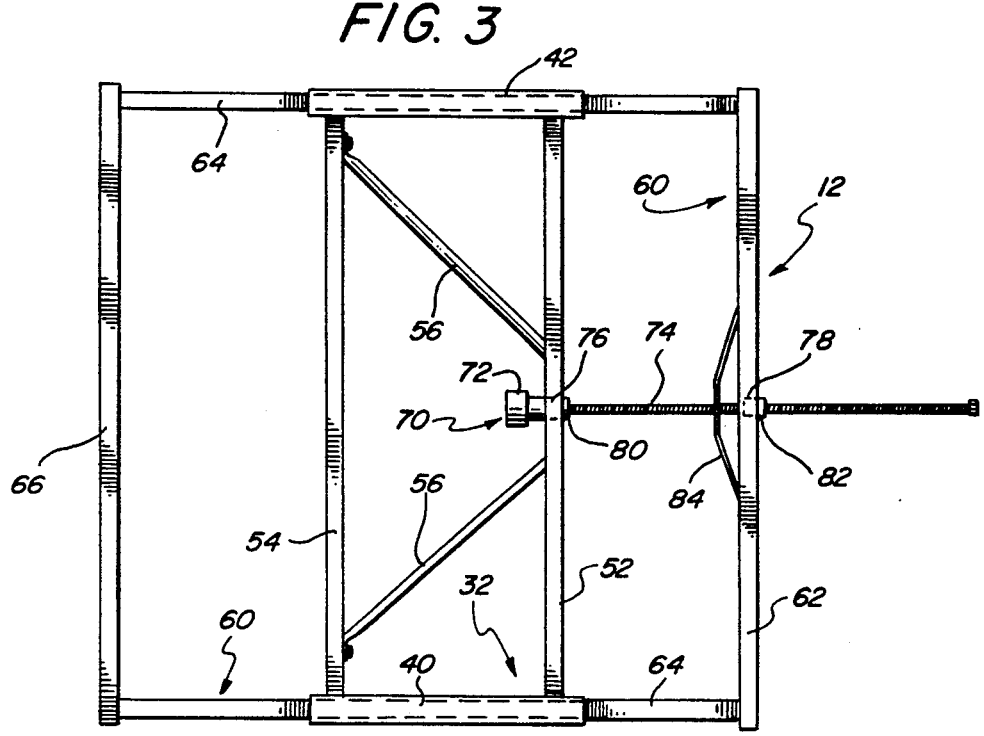
FIG. 3 is a plan view of the preferred embodiment of the slide-out assembly.

A preferred embodiment of the slide-out assembly 12 is shown in FIGS. 2 and 3. The slide-out assembly 12 includes a stationary main frame assembly 32 affixed to chassis members 34 of the RV 5. The main frame assembly 32 includes two pairs of support beams 36, 38 that may be bolted or welded to the chassis members 34 for affixing the slide-out assembly 12 to the RV 5. The support beams 36, 38 may be steel C-channels 3 inches long with 2-inch sides and 10 inches tall. Affixed on top of the pairs of support beams 36, 38 are a first rectangular, hollow, elongated guide or support member 40 and a second rectangular, hollow, elongated guide or support member 42. The support members 40, 42 may be steel, for example, and can be 22 inches long, 2½ inches wide, and 5 inches high. Affixed in each end 44, 46 of the support members 40, 42 are a top steel roller 48 and a bottom steel roller 50. The bottom rollers 50 are greater in diameter than the top rollers 48 in the preferred embodiment.

Interposed between the support members 40, 42 are a pair of parallel cross beams 52, 54. The cross beams 52, 54 hold the support members 40, 42 in a first parallel relationship. The cross beams 52, 54 may be steel U-channels that are 2 inches wide with 1½-inch sides, and may be affixed to the support members 40, 42 using bolts or welding. A pair of steel support rods 56 are angled between the cross beams 52, 54 to increase the structural stability of the main frame assembly 32.

A substantially square slidable support assembly 60 is slidably retained in the support members 40, 42. The slidably support assembly 60 includes a transmission beam 62, a pair of rails 64, and a support beam 66 affixed to the rails 64 using support flanges 68. The rails are affixed to the ends of the transmission beam 62 and to the support flanges 68 for holding the transmission beam 62 and support beam 66 in a fixed parallel position. The rails 64 may be 75 inches long and 2 inches square so they may be slidably retained in the hollow support members 40, 42. The support members' steel rollers 48, 50 enhance the ease with which the rails 64 slide through the support members 40, 42.

The support beam 66 may be a formed C-channel 3⅝ inches wide with 2-inch sides. The support beam 66 may be two separate sections, depending upon mounting needs. The transmission beam 62 may be a 3-inch by 3-inch portion of angled steel. The length of the cross beams 52, 54, support beam 66, and transmission beam 62 may vary, depending upon the desired length of the room.

A transmission mechanism 70 is mounted at a center portion of the cross beam 52 located closest to the transmission beam 62. The transmission mechanism includes a motor 72, such as an electric motor, and an elongated worm gear 74. The worm gear 74 is disposed through an opening 76 in the cross beam 52, and extends through an opening 78 in the transmission beam 62. The worm gear 74 couples to the motor 72 through a steel coupling 80 mounted in the opening 76. A threaded sleeve 82 is welded in the transmission beam's opening 78 to rotatably couple the worm gear 74 to the transmission beam 62. A gear support 84 is affixed to the transmission beam 62 for supporting the worm gear 74 and the threaded sleeve 82.

An electric cable 86 is located in each rail 64 for providing electrical current to the room 10 through junction boxes 88. A pair of carrier chains 90 carry the cable 86 into the rails 64 for preventing the cable 86 from binding or becoming damaged when the slidable support assembly 60 is moving. Since the cable 86 is located in the rails 64, the cable 86 is also prevented from being damaged by environmental elements when the room 10 is extended and when the RV 5 is being transported.

Figure 6:
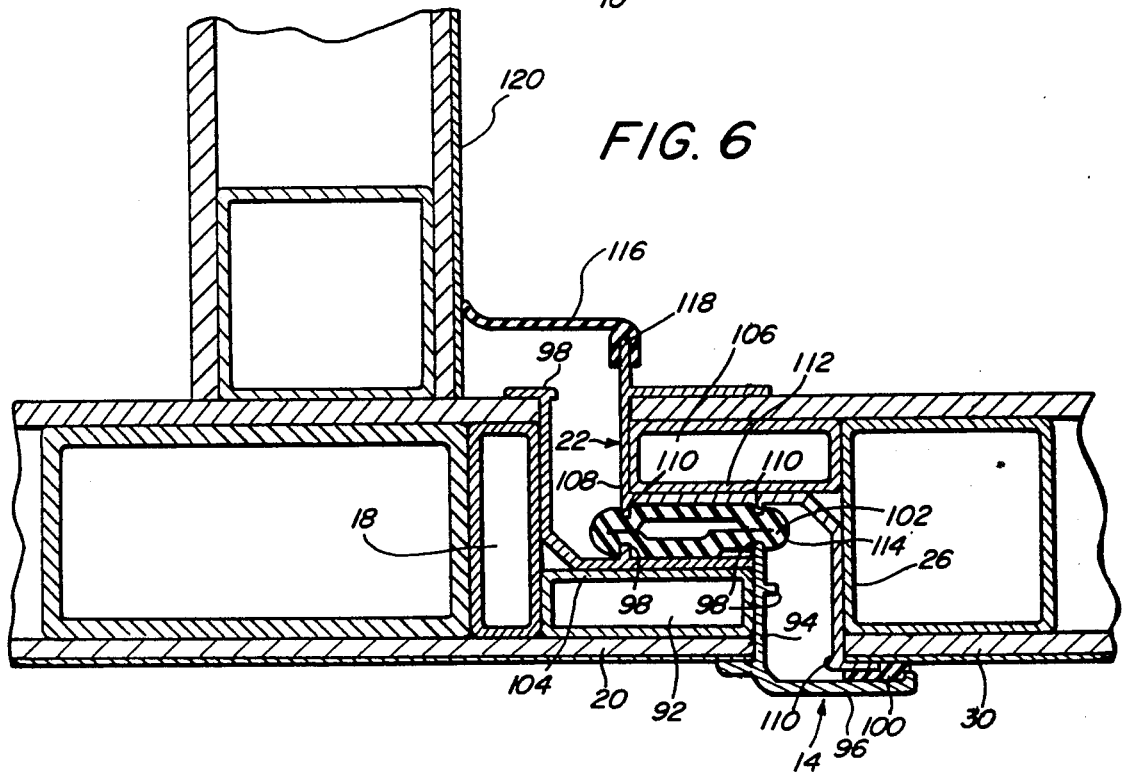
FIG. 6 is a partial cross-sectional view showing the sealing assembly in a sealed position.
Figure 5:
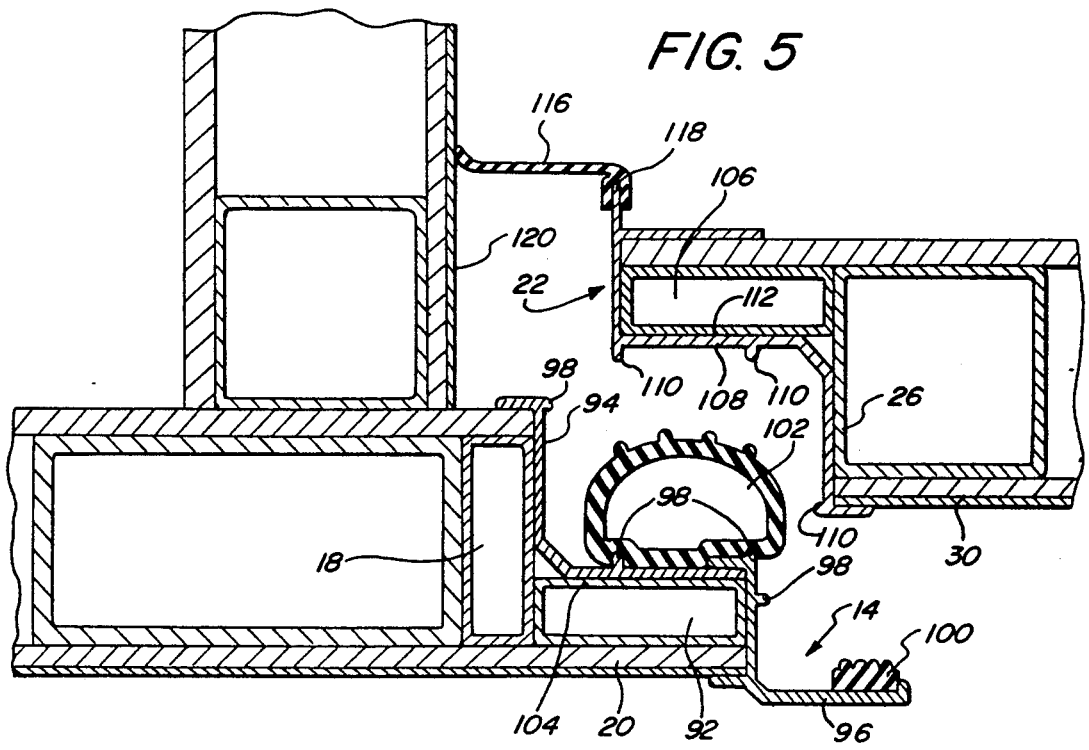
FIG. 5 is a partial cross-sectional view showing the preferred embodiment of the sealing assembly in an open configuration.

FIGS. 4, 5, and 6 show the first liquid sealing assembly 14 and the second liquid sealing assembly 22 constructed according to the preferred embodiment 10. The first liquid sealing assembly 14 is made integral with the top edge 16 and side edges 18 of the room's exterior wall 20. The second sealing assembly is made integral with the top edge 24 and side edges 26 of the substantially rectangular opening 28 in the RV's exterior wall 30.

The first sealing assembly 14 includes a first L-shaped shoulder 92 that extends along the room's top edge 16 and side edges 18. A first L-shaped flange member 94 is affixed to the L-shaped shoulder 92. The flange member 94 includes an elongated end portion 96 that extends axially away from the room's exterior wall 20. The flange member 94 also has a plurality of protrusions 98 that extend away from the shoulder 92. An elongated flexible ridge seal 100 is affixed to the first flange member's elongated portion 96. A flexible ridge bulb seal 102 is affixed between a pair of the flange member's protrusions 98 located on an elongated portion 104 of the exterior wall's shoulder 92.

The second sealing assembly 22 includes a second L-shaped shoulder 106 complementary to the first L-shaped shoulder 92. A second L-shaped flange member 108 is affixed to the second L-shaped shoulder 106. The flange member 108 includes a plurality of protrusions 110 that extend away from the shoulder 106.

A pair of the second flange member's protrusions 110, located on an elongated portion 112 of the second L-shaped shoulder 106, are aligned with the pair of protrusions 98 located on the elongated portion 104 of the exterior wall's shoulder 92. The pairs of protrusions 98, 110 are aligned so that when the room 10 is completely contracted into the RV 5 (shown in FIG. 6), the flexible ridge bulb seal 102 is compressed between the first flange member 94 and second flange member 108. The adjacent pairs of protrusions 98, 100 extend into the compressed bulb seal 102, thus pinching compressed ends 114 of the bulb seal 102 to prevent liquid from flowing between the first and second flange members 94, 108.

A flexible wiper 116 is affixed to an end 118 of the second flange member 108 that extends parallel to a side wall 120 of the room 10. The wiper 116 extends away from the second flange member's end 118 and perpendicular thereto and abuts the room's side wall 120. When the room 10 is being extended or contracted, the wiper 116 wipes liquid from the room's side walls 120.

FIG. 7 shows a cross-section of the invented slidable room 10 fully contracted into the RV 5. In the preferred embodiment, a subfloor 122 is mounted to the chassis 34. The support beams 36, 38 extend through the subfloor 122 and affix to the support members 40, 42. A main floor 124 is mounted above the support members 40, 42 using floor joists 126. At least one roller 128 is mounted to the main floor 124 below a floor 130 of the slide-out room 10. Electrical current is provided to the room 10 from the cable 86 through the junction boxes 88.

When the RV 5 is being transported, the room 10 is maintained fully contracted into the RV 5. The first liquid sealing assembly's ridge flexible seals 100, 102 are pressed tightly against the second liquid sealing assembly 22 to prevent liquid such as rain water from flowing between the RV 5 and room 10 and into the RV 5. The protrusions 98, 110 of the sealing assemblies 14, 22 further decrease the possibility that water would flow between the flange members 94, 108. The room's exterior wall 22 is flush with the RV's exterior wall 30 to enhance the aesthetics of the RV 5.

The room 10 is extended away from the RV 5 by energizing the motor 72. The motor 72 rotates the worm gear 74 in the desired direction to draw the slidable support assembly 60 towards the main frame assembly 32, thus extending the room 10 away from the RV 5. The main floor's rollers 128 increase the ease with which the room 10 travels across the RV's main floor 124. The steel rollers 48, 50 aid the rails 64 as they slide through the support members 40, 42. When the room 10 is fully extended from the RV 5, a current limiting switch (not shown) senses the excessive current draw and shuts off the motor 72. The room 10 is retracted by alternating the current limiting switch and reversely energizing the motor 72 to alter the angle of rotation of the worm gear 74, for pushing the slidable support assembly 60 into the RV 5 for contracting the room 10.

The support members 40, 42, in combination with the rails 64 and support beams 66, bear the load of the room 10, while the room 10 is in transition and when it is extended. Thus, the transmission mechanism 70 is not load-bearing. The electrical cable 86 and transmission mechanism 70 are not exposed to environmental elements, such as water and road grime, since the cable 86 is retained in the rails 64 and the transmission mechanism 70 is retained in the RV 5.

The above features of the present invention teach apparatus, method, and an improved slidable room having an improved slide-out assembly for sliding the room and an improved sealing assembly to prevent liquid from flowing between the room and the recreational vehicle. It can be readily appreciated that it would be possible to deviate from the above embodiments of the present invention and, as will be readily understood by those skilled in the art, the invention is capable of many modifications and improvements within the scope and spirit thereof. Accordingly, it will be understood that the invention is not to be limited by the specific embodiments, but only by the spirit and scope of the appended claims.

What is claimed is:

1. In a slidable room for use with a housing assembly having an opening with a top edge and side edges having an interior and an exterior side for receiving the slidable room, the slidable room having an exterior wall with a top edge and side edges having an interior and an exterior side, the improvement comprising:

a main frame assembly affixed to the housing assembly including a pair of spaced a hollow, elongated support members;

a transmission assembly fixedly interposed between the support members for providing a moving force to the slidable room;

a slidable support assembly coupled to the transmission assembly and affixed to the slidable room, the support assembly slidably retained in the pair of support members for extending and contracting in response to operation of the transmission assembly, and a liquid sealing assembly extending between the top edge and side edges of the exterior wall of the room and the top edge and side edges of the opening, the sealing assembly including a first flange member affixed to the interior side of the top edge and side edges of the exterior wall of the room, and a second complementary flange member affixed to the exterior side of the top edge and side edges of the opening, the first and second flange members having a plurality of adjacent protrusions for inhibiting liquid from flowing therebetween.

2. The invention of claim 1, wherein the sealing assembly further comprises a flexible bulb seal, having a plurality of ridges, affixed to the first flange member and interposed between two of said plurality of protrusions, a flexible seal, having a plurality of ridges, disposed on the first flange member and a flexible wiper affixed to the second flange member extending along the side edges of the opening.

3. The invention of claim 2, wherein the slidable support assembly includes a support beam affixed to the room, the support beam has respective ends and a transmission beam coupled to the transmission assembly, the transmission beam has respective ends and a pair of rails, the support beam and transmission beam being held in a fixed parallel relationship by the pair of rails, each affixed to either end of the support beam and the transmission beam, the pair of rails slidably retained in the hollow support members for sliding the support assembly.

4. The invention of claim 3, wherein the main frame assembly further comprises:
   a pair of parallel cross beams affixed to the hollow support members for retaining the support members in a fixed parallel relationship, and
   the transmission assembly includes a motor mounted to one of the cross beams located proximal to the transmission beam, an elongated rotatable worm gear is disposed through the cross beam and is coupled to the motor and rotatably affixed to the transmission beam for sliding the support assembly in a direction responsive to a rotation of the worm gear.

5. The slidable room of claim 4, including an electrical connection in the room and an electrical cable disposed in each of the rails and coupled to the electrical connection in the room for providing power to the room.

6. In a slidable room for use with a housing having an interface and an opening for receiving the slidable room, said room having an exterior wall including a top edge and side edges and said opening having a top edge and side edges, comprising:
   means for supporting the slidable room;
   means for extending and contracting the room support means affixed thereto, the extending and contracting means including a single transmission means, and
   means for inhibiting flow of any liquid entering between the interface of the top edge and side edges of the exterior wall of the room and the top edge and side edges of the opening, the liquid flow inhibiting means including a pair of complementary elongated flange members, a first flange member affixed to the top edge and side edges of the exterior wall of the room, and a second flange member affixed to the top edge and side edges of the opening, the complementary flange members having a plurality of adjacent elongated protrusions extending along a length of the respective flange members for inhibiting flow of liquid therebetween.

7. The slidable room of claim 6, wherein the support means comprises a slidable support assembly including a support beam affixed to the room and a transmission beam rotatably coupled to the extending and contracting means and a pair of rails, the support beam and transmission beam held in a fixed parallel relationship by the pair of rails, each rail affixed to either end of the support beam and transmission beam.

8. The slidable room of claim 7, wherein the extending and contracting means comprises a stationary main frame assembly affixed to the housing, including a pair of parallel cross beams and a pair of rectangular, hollow, elongated support members held in a fixed parallel relationship by the pair of parallel cross beams, the support members adapted to slidably retain the rails of the support means for extending and contracting the support means, and the transmission means comprises a motor mounted to the cross beam located proximal to the transmission beam of the support means, the motor having an elongated rotatable worm gear disposed to the cross beam and rotatably affixed to the transmission beam for sliding the support means in a direction responsive to the rotation of the worm gear.

9. A slidable room having an exterior wall including a top edge and side edges for use with a housing assembly having a square opening with a top edge and side edges, comprising:
   a stationary main frame assembly affixed to the housing assembly, including a pair of spaced hollow, rectangular, elongated support members held in a fixed parallel relationship, and a transmission assembly fixedly interposed between the support members;
   a slidable support assembly coupled to the transmission assembly and affixed to the room, the support assembly slidably retained in the pair of hollow support members for extending and contracting the room in response to operation of the transmission assembly;
   a first flange member affixed to the top edge and side edges of the exterior wall of the room, the first flange member having an elongated portion extending axially away from the exterior wall of the room and including a plurality of protrusions, and
   a complementary second flange member affixed to the top edge and side edges of the opening, the second flange member having a plurality of protrusions complementary to the protrusions on the first flange member for inhibiting liquid from flowing between the first flange member and the second flange member.

10. The slidable room of claim 9, wherein the sealing assembly further comprises a flexible bulb seal, having a plurality of ridges, affixed to the first flange member and interposed between a pair of the plurality of protrusions, a flexible seal, having a plurality of ridges, disposed on the first flange member and a flexible wiper affixed to the second flange member extending along the side edges of the opening.

11. The slidable room of claim 10, wherein the slidable support assembly includes a support beam affixed to the room, a pair of rails, and a transmission beam coupled to the transmission assembly, the support beam and transmission beam held in a fixed parallel relationship by the pair of rails, each affixed to the support beam and the transmission beam, the pair of rails slidably retained in the hollow support members for sliding the support assembly.

12. The slidable room of claim 11, wherein the main frame further comprises:

a pair of parallel cross beams affixed to the hollow support members for retaining the support members in a fixed parallel relationship, and the transmission assembly including a motor mounted to one of the cross beams located proximal to the transmission beam for sliding the support assembly.

13. The slidable room of claim 12, wherein an electrical cable is disposed in each of the rails and a junction box is connected to the room for providing power to the room, and each of the electrical cables is connected to the junction box.

14. In a slidable room with a ceiling, floor and walls for use with a housing assembly having an opening for receiving the slidable room, the improvement comprising:

a main frame assembly affixed to the housing assembly, including a pair of spaced hollow, elongated support members positioned beneath the slidable room;

sets of rollers mounted within each support member;

support rails mounted in each respective support member on a pair of the roller sets, the support rails being connected to the slidable room to move and support the slidable room;

a force transmission assembly mounted within the main frame assembly and between the support members and connected to each support rail for extending and contracting the slidable room relative to the housing assembly;

sealing means extending about the housing assembly opening and slidable room for sealing the slidable room in both an extended and contracted state;

an electrical junction assembly connected to the slidable room; and an electrical cable connected to the electrical junction assembly for supplying electrical power, wherein at least one of the support rails is hollow and carries the electrical cable therethrough for connection to the electrical junction assembly.

15. The invention of claim 14 further including a protective carrier chain assembly extending from the hollow support rail to enable bending of the electrical cable during an extension and contraction of the slidable room.

16. The invention of claim 14 wherein the sealing means includes a stepped flange assembly having a first and second support surface adjacent the slidable room, and a first flexible bulbous seal attached inwardly on the flange assembly to the first support surface and a second flexible seal attached outwardly on the second support surface.

17. The invention of claim 16 further including a third wiper seal extending between the housing assembly and the slidable room.

18. The invention of claim 16 wherein the stepped flange assembly further includes elongated protrusions to guide liquid in a downward flow direction.

19. In a slidable room with a ceiling, floor and walls for use with a housing assembly having an opening for receiving the slidable room, the improvement comprising:

a main frame assembly affixed to the housing assembly, including a pair of spaced hollow, elongated support members positioned beneath the slidable room;

sets of rollers mounted on each support member;

support rails having a first end and a second end mounted in each respective support member on the roller sets, the support rails being connected to the slidable room to move and support the slidable room at the first end;

a force transmission assembly mounted within the main frame assembly and between the support members and being connected at the second end of each support rail for extending and contracting the slidable room relative to the housing assembly, wherein the force transmission assembly and the second end of the support rails stay within the main frame assembly for protection against the environment, with the first end connected to the slidable room assembly so as to be positioned adjacent the housing assembly opening when the slidable room is contracted, and the second end of the support rails being driven for extending the slidable room by the force transmission assembly; and first and second sealing means extending about, respectively, the housing assembly opening and the slidable rooms for sealing the slidable room in both an extended and contracted state.

20. The invention of claim 19 wherein the first sealing means includes a wiper sealing member extending from the housing assembly towards the slidable room.

21. The invention of claim 20 wherein the second sealing means includes a stepped flange having a first and second support surface adjacent the slidable room, and a first flexible bulbous sealing member attached inwardly on the flange to the first support surface and a second flexible sealing member attached outwardly on the second support surface.

22. The invention of claim 21 wherein the stepped flange further includes elongated protrusions to guide liquid in a downward flow direction.

* * * * *